United States Patent [19]

Steely

[11] Patent Number: 4,845,415

[45] Date of Patent: Jul. 4, 1989

[54] MULTIPLEX CONTROL SYSTEM FOR RETURNING A MOTOR DRIVEN ELEMENT TO A STORED POSITION

[75] Inventor: Lee W. Steely, Reinholds, Pa.

[73] Assignee: AMP Incorporated, Harrisburg, Pa.

[21] Appl. No.: 130,146

[22] Filed: Dec. 8, 1987

[51] Int. Cl.[4] .................. G05B 19/42; G05D 3/10; B60N 1/02

[52] U.S. Cl. .................. 318/568.1; 318/466; 307/10.1

[58] Field of Search .............. 307/9, 10 R, 10 SB; 318/466, 467, 484, 562, 568, 603

[56] References Cited

U.S. PATENT DOCUMENTS

| | | | |
|---|---|---|---|
| 4,293,947 | 10/1981 | Brittain | 370/89 |
| 4,401,928 | 8/1983 | Kamijo et al. | 318/467 X |
| 4,463,426 | 7/1984 | Caddick et al. | 318/466 X |
| 4,467,252 | 8/1984 | Takeda et al. | 318/603 |
| 4,682,168 | 7/1987 | Chang et al. | 340/825.65 |
| 4,689,537 | 8/1987 | Mizuta et al. | 318/466 X |
| 4,706,194 | 11/1987 | Webb et al. | 318/466 X |

Primary Examiner—Bentsu Ro

[57] ABSTRACT

A multiplex system for a vehicle includes a controller and at least two remote stations. The remote stations receive input signals indicative of commanded motor operation, and they generate output signals which command power seat motor operation. In order to store a desired seat position, the controller first commands the motors to the home position and then automatically times periods of motor operation for each of the motors as the motors are manually controlled to move the power seat to a selected position. These timed periods of motor activation are then stored as motor activation times. When it is desired to return the seat to the stored position, the controller operates automatically to move the motors to the respective home positions and then automatically to generate motor control signals to drive each of the motors for a time corresponding to the respective motor activation times.

8 Claims, 13 Drawing Sheets

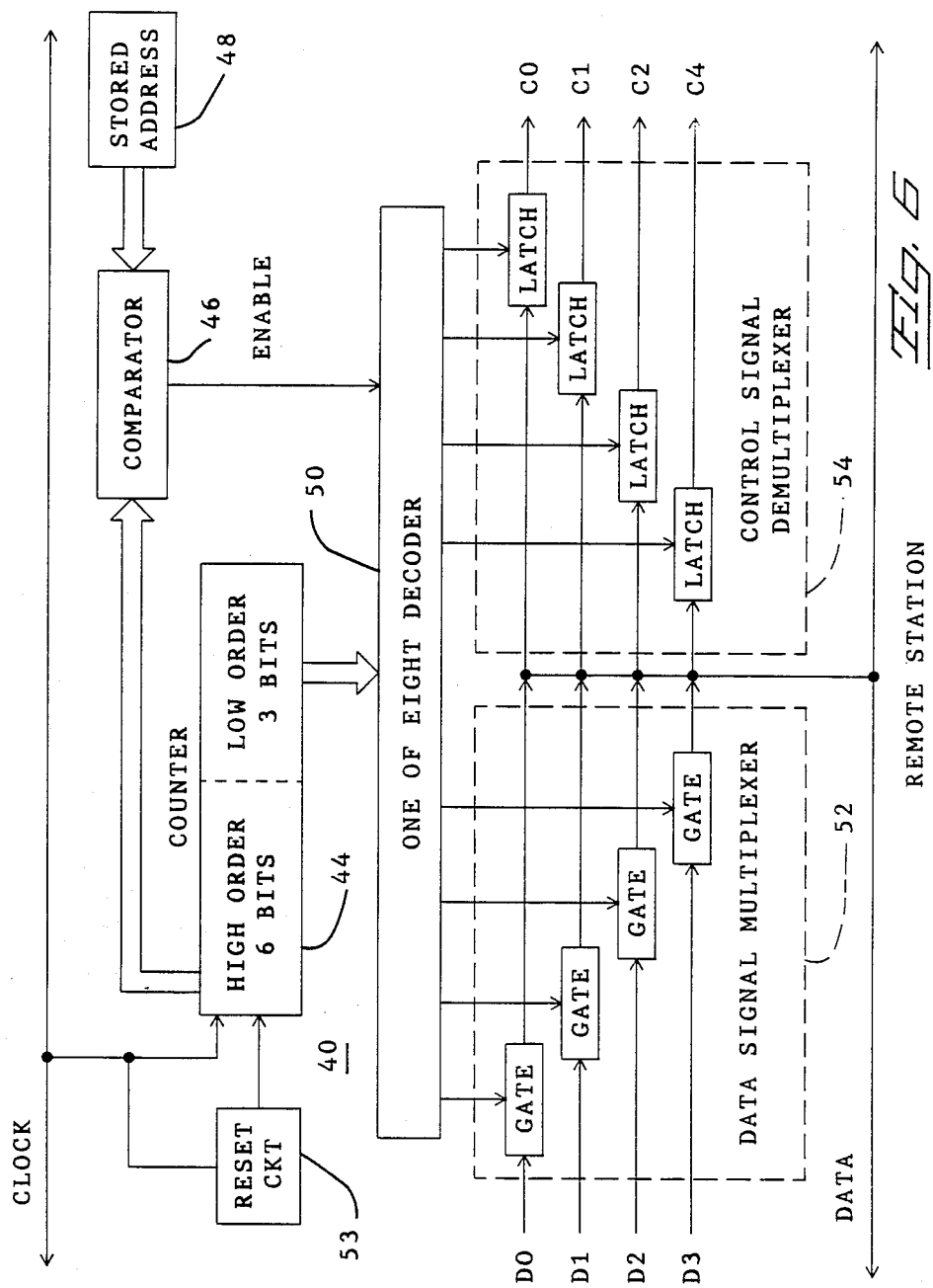

TABLE 1

```
MEMORY
ADDRESS
00023F: D2 D3 C2 D4 85 4E F0 E5 36 23 23 44 67 F5 45 E5
00024F: 35 44 F8 55 45 F5 45 E5 35 C4 03 44 FC F5 4F E5
00025F: 34 44 1B 55 4F F5 4F 20 F2 06 E5 32 44 38 55 4F
00026F: 55 45 F4 70 30 DE 25 7E 01 02 F0 D2 59 20 5C 09
00027F: 30 F1 4C 30 F3 13 30 F4 10 43 26 FF 43 27 0F 43
00028F: 24 F0 43 25 FF 85 F0 4E 22 02 04 B6 BE 0C 00 40
00029F: DC 85 F0 4E 22 0E BE 18 00 40 F1 1E E5 45 44 04
0002AF: B5 7B 02 80 04 F5 7B D2 59 30 59 13 75 41 F0 E5
0002BF: 45 F4 60 09 30 F1 04 02 F3 D2 F4 D2 F1 C2 59 74
0002CF: F0 C2 AF B5 41 00 D2 AF 50 07 75 41 FF D2 F1 80
0002DF: 9C C2 D3 D2 D4 E5 45 20 5C 17 20 F1 14 74 75 C2
0002EF: 13 C2 4A C2 0E C2 46 A2 67 92 11 92 49 92 00 92
0002FF: 45 A2 E2 40 1F 20 5C 1C 30 E4 19 30 E3 04 C2 E3
00030F: 80 12 C2 F1 C2 F2 75 41 F0 E4 F9 FA FB FC FD FE
00031F: FF 02 03 DF 92 33 A2 E1 40 08 20 5C 05 30 E3 02
00032F: C2 E4 92 32 82 E2 92 27 40 04 A2 67 92 31 A2 E0
00033F: 92 37 A2 E7 92 36 82 37 40 04 A2 67 92 35 A2 E4
00034F: 40 40 20 5C 3D 30 27 3A D2 E4 30 F0 34 30 F2 1F
00035F: 20 A3 2E A9 51 AA 52 AB 53 AC 54 AE 56 AD 55 AF
00036F: 57 89 FF 02 80 1B C2 F3 C2 F1 75 41 F0 80 12 D2
00037F: F2 C2 F0 89 51 8A 52 8B 53 8C 54 8E 56 8D 55 8F
00038F: 57 D3 92 3B A2 E3 40 3E 20 5C 3B 30 27 38 30 F0
00039F: 34 30 F2 1F 20 A3 2E A9 58 AA 59 AB 5A AC 5B AE
0003AF: 5D AD 5C AF 5E 89 FF 02 80 1B C2 F4 C2 F1 75 41
0003BF: F0 80 12 D2 F2 C2 F0 89 58 8A 59 8B 5A 8C 5B 8E
0003CF: 5D 8D 5C 8F 5E D3 92 3A 82 E4 40 04 A2 67 92 39
0003DF: D2 27 E5 AF A2 E5 92 27 A2 E6 92 26 82 E5 40 04
0003EF: A2 67 92 25 A2 E7 92 2B A2 E2 92 2A 82 E7 40 04
0003FF: A2 67 92 29 A2 E0 92 2F A2 E1 92 2E 82 E0 40 04
00040F: A2 67 92 2D 30 F2 10 30 F1 06 30 F3 07 30 F4 04
00041F: 85 F0 4E 22 02 04 B6 E5 22 20 E2 04 20 54 0C 0C
00042F: 20 E3 08 20 54 05 1C BC FF 01 0C E5 29 20 E3 04
00043F: 20 54 0C 0E 20 E2 08 20 54 05 1E BE FF 01 E3 E5
00044F: 21 20 E7 04 20 54 0C 0D 20 E6 08 20 54 05 1D BD
00045F: FF 01 0D E5 28 20 E7 04 20 54 0C 0F 20 E6 08 20
00046F: 54 05 1F BF FF 01 0F E5 26 20 E3 04 20 54 0C 09
00047F: 20 E2 08 20 54 05 19 B9 FF 01 09 E5 27 20 E3 04
00048F: 20 54 0C 0A 20 E2 08 20 54 05 1A BA FF 01 0A E5
00049F: 26 20 E7 04 20 54 0C 0B 20 E6 08 20 54 05 1B BB
0004AF: FF 01 0B 85 F0 4E 22 C2 D3 D2 D4 BC 00 05 43 22
0004BF: 0F 80 0C 20 54 01 1C C2 12 D2 13 A2 67 92 11 BE
0004CF: 00 05 43 29 0F 80 0C 20 54 01 1E C2 4B D2 4A A2
0004DF: 67 92 49 BD 00 05 43 21 F0 80 0C 20 54 01 1D C2
0004EF: 0F D2 0E A2 67 92 0D BF 00 05 43 28 F0 80 0C 20
0004FF: 54 01 1F C2 47 D2 46 A2 67 92 45 89 00 05 43 26
00050F: 0F 80 0C 20 54 01 19 C2 33 D2 32 A2 67 92 31 BA
00051F: 00 05 43 27 0F 80 0C 20 54 01 1A C2 3B D2 3A A2
00052F: 67 92 39 BB 00 06 43 26 F0 02 05 47 20 54 01 1B
00053F: C2 37 D2 36 A2 67 92 35 BC 00 16 BE 00 13 BD 00
00054F: 10 BF 00 0D B9 00 0A BA 00 07 BB 00 04 D2 F3 D2
00055F: F4 85 F0 4E 22
```

OBJECT CODE COPYRIGHT 1987 AMP INCORPORATED

MULTIPLEX CONTROL SYSTEM FOR RETURNING A MOTOR DRIVEN ELEMENT TO A STORED POSITION

BACKGROUND OF THE INVENTION

The present invention relates to a multiplex system of the type which uses a central controller and a plurality of remote stations to control a plurality of motors in response to motor control signals.

One feature commonly available in modern automobiles is that of a power seat which uses electric motors to position the seat to suit an individual driver. Often, such power seats include memory systems which allow a particular seat position to be stored. Means are provided for automatically returning the power seat to the stored position. In the past, such memory seat systems have also included means for storing a selected position of the outside mirrors, and automatically moving the outside mirrors to the previously stored position.

One approach to implementing the memory seat functions described above is to provide an absolute position encoder for each axis of travel of the power seat motors and the mirror motors. For example, potentiometers can be linked to each motor axis to provide an analog voltage that can be used as a measure of the position of the seat or mirror along the respective axis. This approach provides the disadvantage that it requires position encoders to implement the memory seat function. These encoders increase the cost and complexity, and reduce the reliability of the overall system.

For some time there has been an interest in utilizing multiplex motor control systems in vehicles. Brittain U.S. Pat. No. 4,293,947 provides one example of such a system. In spite of this interest in multiplex systems, currently available multiplex systems do not exploit the full potential of the multiplex system to enhance motor control, and in particular to provide a memory seat function without materially increasing the cost or hardware complexity of the system.

SUMMARY OF THE INVENTION

This invention relates to a multiplex system for a vehicle of the type which comprises a driver's seat, a plurality of motors coupled to the seat to adjust seat position along respective axes, and means for generating a plurality of input signals. The multiplex system comprises a central controller, at least one first remote station coupled to the input signals to generate multiplexed input signals in response thereto, and at least one second remote station coupled to the motors to control operation of the motors in response to multiplexed motor control signals generated by the controller. At least one control bus is interconnected between the controller and the remote stations to carry the multiplexed input signals from the first remote station to the controller, and to carry the multiplexed motor control signals from the controller to the second remote station. Means are included in the controller for generating multiplexed motor control signals to control the motors in response to the multiplexed input signals.

According to this invention, the preferred embodiment described below includes first means for generating motor control signals to automatically drive each of the motors to a respective home position, and the controller includes means for storing a set of motor activation times which define a selected seat position. This storing means comprises means for activating the first means to drive the motors to the respective home positions, means for automatically timing periods of motor operation for each of the motors as the motors are manually controlled by the input signals to move the seat to the selected position, and means for storing the timed periods of motor activation as the motor activation times. The controller also includes means for automatically moving the seat to the selected seat position, and this moving means comprises means for activating the first means to drive the motors to the respective home positions, and means for automatically generating motor control signals to drive each of the motors for a time corresponding to the respective motor activation times to drive the seat to the selected position.

Though described in conjunction with a power seat in the following detailed example, this invention is not limited to use with power seats. Rather, this invention can be adapted widely to motors that are to be controlled to move a driven element to a stored position. The embodiment described above provides the important advantage that the memory seat function is provided without any increase in hardware, other than the small amount of additional memory needed to store the program for obtaining the functions described above. In particular, no sensors of any type, and no absolute or incremental position encoders are required. This markedly reduces the hardware complexity and cost of the system, along with associated reliability problems.

The memory seat system described above utilizes the time of motor activation as a signal indicative of motor operation, and integrates this signal in order to locate the driven elements along the respective axes. By using the time of motor activation as the signal indicative of motor operation, the important advantage is obtained that no position sensors of any type are required. However, this invention can also be implemented in systems which use other types of signals indicative of motor operation to determine the position of power seat motors along their axes. For example, a simple toothed wheel or segmented disk can be mounted so as to rotate during periods of motor operation. Magnetic or optical sensing means can then be provided to generate a periodic signal indicative of rotation of the toothed wheel or segmented disk. This periodic signal can then be integrated to determine motor position. The use of such additional incremental position sensors increases the hardware complexity and therefore the cost of the overall system, but provides the advantage of a somewhat more accurate measure of motor position.

The invention itself, together with further objects and attendant advantages, will best be understood by reference to the following detailed description, taken in conjunction with the accompanying drawings.

BRIEF DESCRIPTION OF THE DRAWINGS

FIG. 6 is a block diagram of one of the remote stations of FIGS. 4 and 5.

FIGS. 8a and 8b combine to form a flow chart of the Program Set routine called by the routine of FIG. 7a.

DETAILED DESCRIPTION OF THE PRESENTLY PREFERRED EMBODIMENTS

Figure 1:
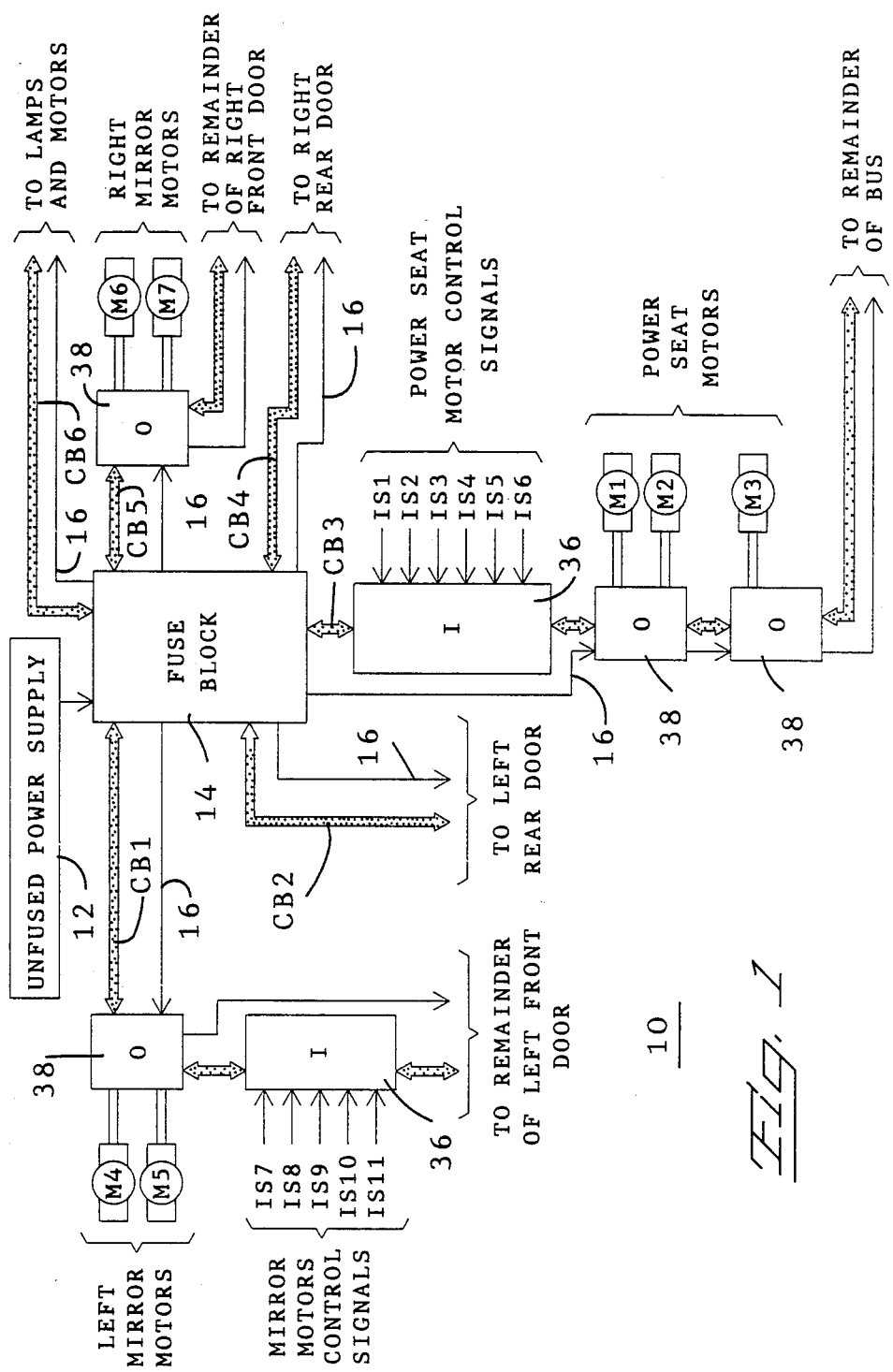
FIG. 1 is a block diagram of a vehicle multiplex system which incorporates a presently preferred embodiment of this invention.

Turning now to the drawings, FIG. 1 is a block diagram of a vehicle multiplex system 10 which is adapted for use with a vehicle such as an automobile of the type which includes an unfused power source 12 and a fuse block 14. A number of DC power buses 16 radiate from the fuse block 14, along with a number of parallel control buses CB1-CB6. FIG. 1 is not intended to show the entire multiplex system of the vehicle, but only those portions important to understanding the operation of this embodiment. As shown in FIG. 1, control bus CB3 receives data input signals IS1-IS6. Each of these signals IS1-IS6 is either in the on or off state, and each indicates desired operation of a respective power seat motor in either the forward or reverse direction along its respective axis. Similarly, the control bus CB3 controls three power seat motors M1-M3. These motors can for example move the driver's seat toward and away from the instrument panel, raise and lower the forward portion of the seat cushion, and raise and lower the rear portion of the seat cushion.

The control bus CB1 receives five additional data input signals IS7-IS11 which control the mirror motors M4-M7. The signals IS7-IS10 can for example command up, down, left and right movement of the mirror motors M4, M6 (up/down) and M5, M7 (left/right), and the signal IS11 can select either the left or right mirror.

Figure 2:
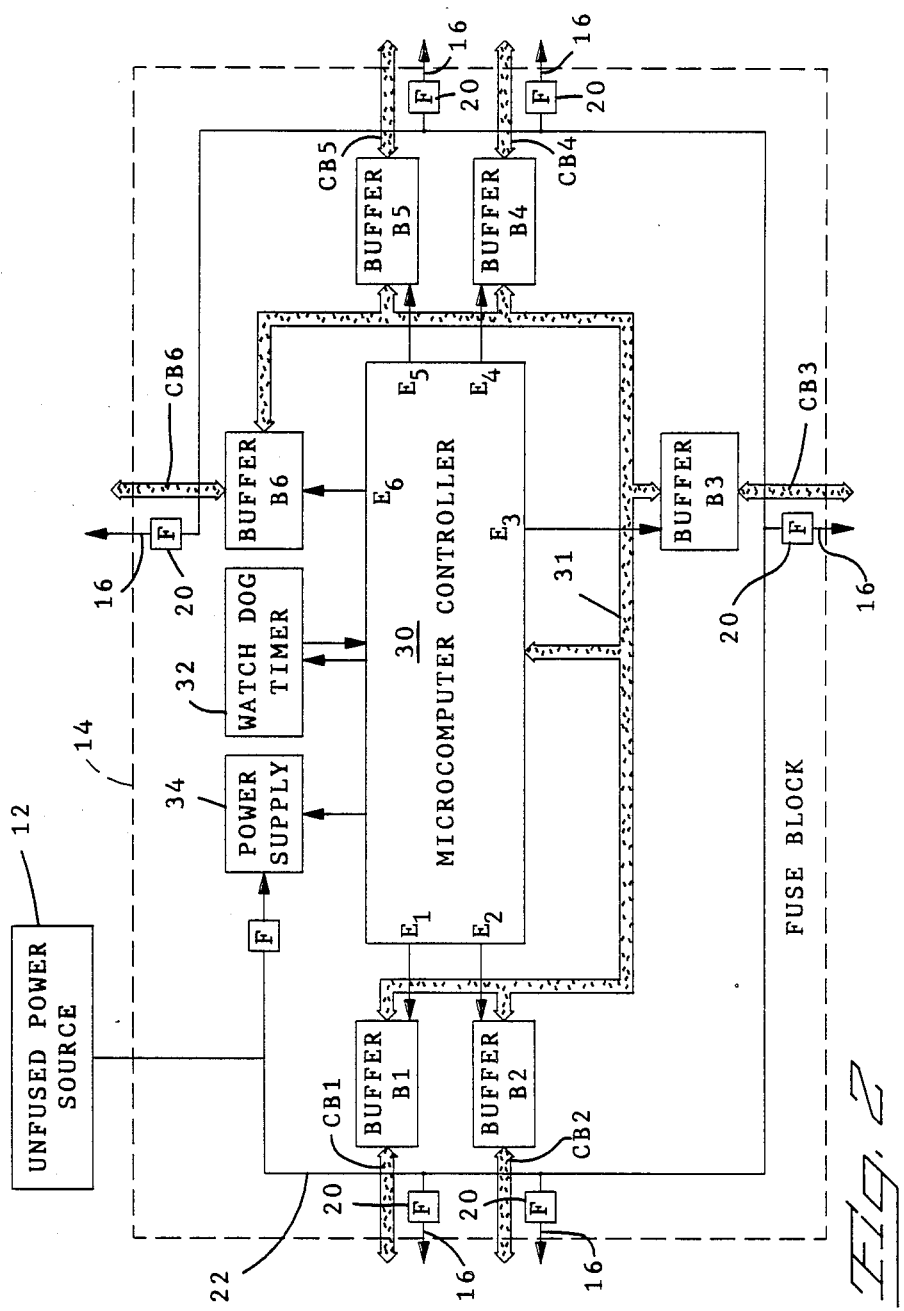
FIG. 2 is a block diagram of the fuse block of FIG. 1.

FIG. 2 shows a more detailed block diagram of the fuse block 14. Fuses 20 are interconnected between the unfused power source 12 and each of the power buses 16. In addition, the fuse block 14 includes a microcomputer controller 30, a watch dog timer 32, a power supply 34, and a number of buffers B1-B6. The controller 30 applies control signals to a control bus 31 and reads multiplexed signals from the control bus 31, and the buffers B1-B6 are controlled to ensure that the control bus 31 is interconnected with only one of the control buses CB1-CB6 at any given time. In this way, the total length of active control bus is minimized, thereby reducing electromagnetic interference and noise susceptibility. Reliability is also improved in that a short in any one of the control buses CB1-CB6 will not interfere with proper operation of the remaining control buses.

Figure 3:
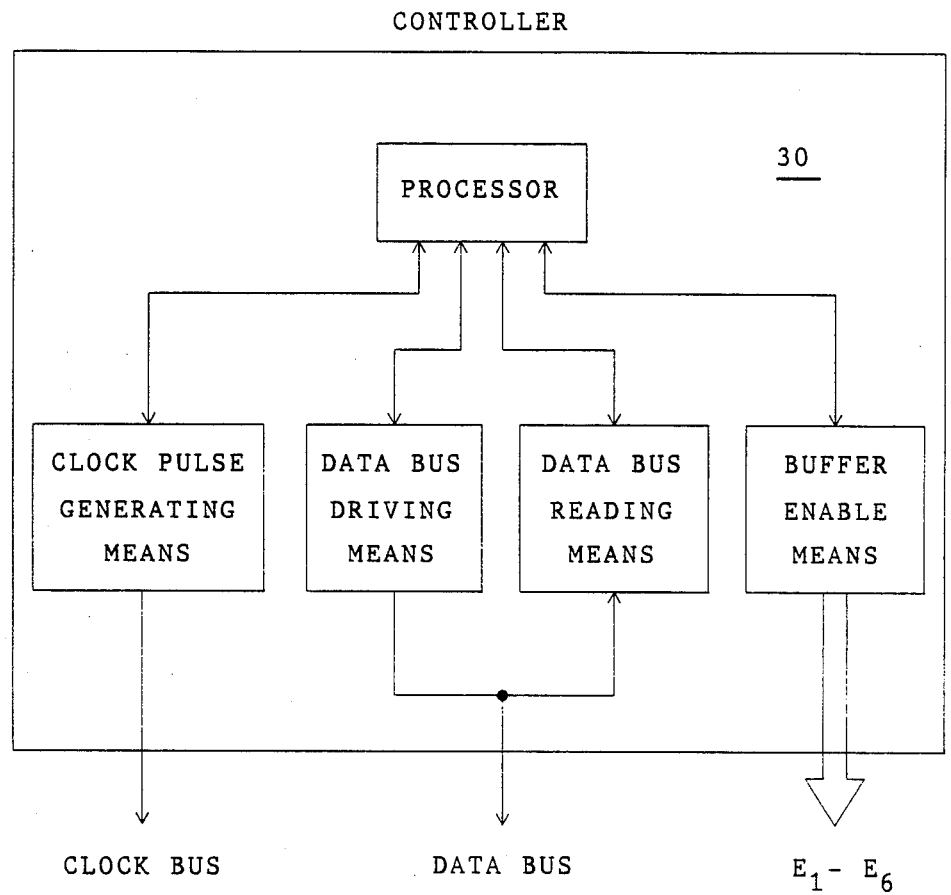
FIG. 3 is a block diagram of the controller of FIG. 2.

As shown in FIG. 3, the controller 30 includes a clock pulse generating means which generates sets of clock pulses on a clock bus, along with data bus driving means and data bus reading means for applying multiplexed signals to and reading multiplexed signals from a data bus, respectively. The clock and data buses are both included in the control bus 31. The controller 30 also includes buffer enable means which generates enable signals E1-E6 to control the buffers B1-B6, and each of these four means is controlled by a processor.

The processor controls the clock pulse generating means to generate clock pulses in sets separated by a period of no clock pulses. Each set of clock pulses comprises n subsets, where n is equal to the total number of separately addressed remote stations, as described below. Each subset includes eight clock pulses, and each clock pulse defines a respective data transmission time slot or channel on the data bus. Thus, each remote station is enabled for one subset of clock pulses (consisting of eight clock pulses and therefore eight time slots) within each set of clock pulses. The processor maintains a table of the state of all of the data channels, including both commands (sent from the controller 30 to the remote stations) and responses (sent from the remote stations to the controller 30). The data bus driving means of the controller 30 uses this table to drive the data bus high or low as appropriate to ensure that commands are sent by the controller 30 to the remote stations at appropriate times to transmit the command portion of the table. The data bus reading means of the controller 30 samples and stores the state of the data bus at appropriate times to ensure that responses from the remote stations are stored in appropriate locations of the table.

The multiplex system 10 of FIG. 1 includes input units 36 and output units 38 that are coupled to the control buses. The input units 36 convert standard signals into a time multiplexed format and apply them at appropriate times to the respective control buses. The output units 38 read the state of the data bus of the control bus at selected times, and latch the reading, which is then used for control purposes.

Figure 5:
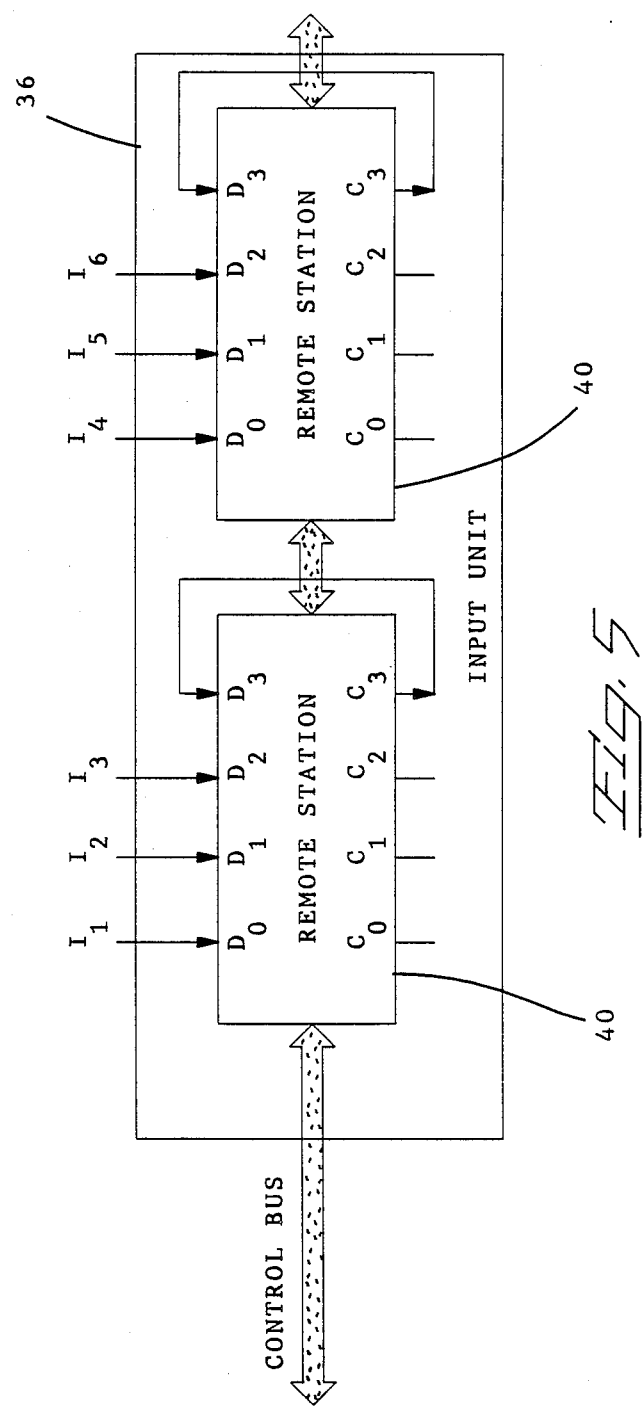
FIG. 5 is a block diagram of one of the input units of FIG. 1.

FIG. 5 shows a block diagram of one of the input units 36. As shown in FIG. 5, each input unit 36 includes two remote stations 40, each of which has inputs D0-D3 for four data signals to be multiplexed and applied to the control bus, and outputs C0-C3 for four command signals which are read from the control bus, demultiplexed, and applied as outputs on the respective terminals. As shown in FIG. 5, control output C3 is applied directly to data input D3 to check for proper operation of each remote station 40.

Figure 4:
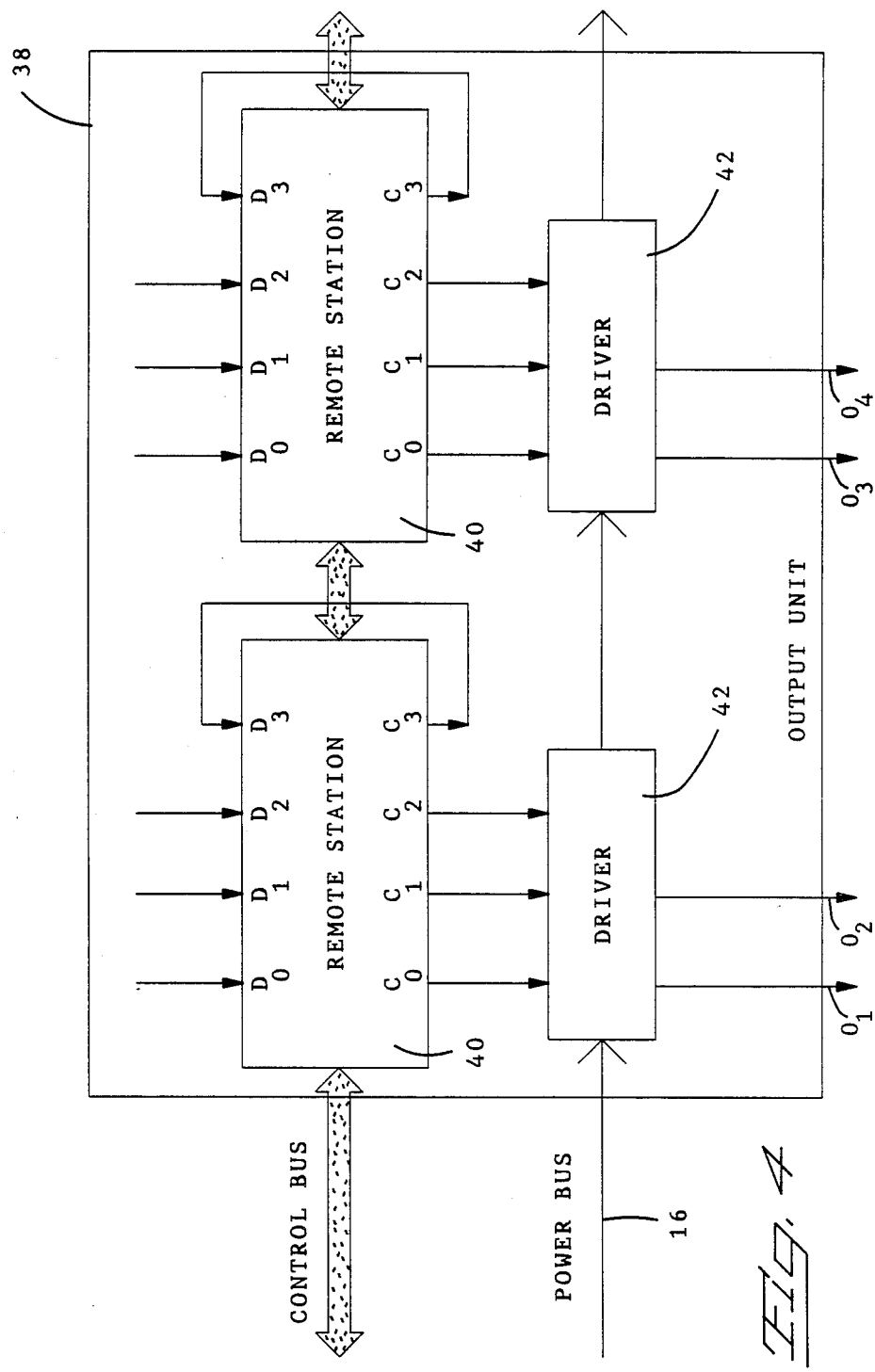
FIG. 4 is a block diagram of one of the output units of FIG. 1.

FIG. 4 shows a block diagram of one of the output units 38, which also includes two remote stations 40 of the type described above. Each output unit 38 also includes two drivers 42 which are interconnected with the power bus 16. Depending upon the state of the control signals C0-C2, the drivers 42 either apply 12 VDC or 0 VDC to power outputs O1-O4.

FIG. 6 shows a block diagram of one of the remote stations 40, which interacts with both the clock bus and the data bus included in the control bus. Each remote station 40 includes an eight bit counter which has a higher order 6 bit section and a lower order 3 bit section. This counter is responsive to the clock pulses on the clock bus. The high order 6 bits of the counter 44 are compared in a comparator 46 with a stored 6 bit address stored in the means 48. When the high order 6 bits of the counter 44 are equal to the stored address in the means 48, the comparator 46 enables a decoder 50 that decodes the low order 3 bits of the counter 44. Typically, each of the remote stations 40 in the system will have a unique address. The remote station 40 includes a data signal multiplexer 52 which includes four gates, each operating to gate a respective one of the data signals D0-D3, as well as a control signal demultiplexer 54 which includes four latches, each arranged to latch and hold a respective one of the control signals C0-C3. Each of the gates and each of the latches is connected to the data bus included in the control bus.

For the eight clock pulse cycles during which the comparator 46 enables the decoder 50, the decoder 50 sequentially enables respective ones of the gates and latches. When any one of the gates is enabled, it applies the respective data signal D0–D3 to the data bus. Similarly, when any of the latches is enabled, it latches and holds the state of the data bus at the corresponding time, and applies the latched state as a command signal C0–C3.

In order to synchronize the counter 44 with the controller 30, the remote station 40 includes a reset circuit 53 which monitors the clock bus for an absence of clock pulses. Whenever the reset circuit 53 fails to detect a clock pulse for a selected time interval, the reset circuit resets the counter 44 to zero. The controller transmits the clock pulses in sets, and each set is separated by a period of no clock pulses longer than the selected time interval of the reset circuit 53. Thus, the reset circuit 53 resets the counter 44 between each set of clock pulses.

The present invention is not limited to the particular type of vehicle multiplex system described above; however, further features of this multiplex system can be found in U.S. Patent Application Ser. No. 107,623 (filed Oct. 9, 1987), which defines the presently preferred construction for the fuse block 14, buses CB1–CB6, input and output units 36, 38; Ser. No. 064,917 (filed June 19, 1987), which defines the presently preferred structure for the driver 42; and U.S. Ser. No. 837,911 (filed Mar. 10, 1986), which defines the presently preferred structure for the data bus driving and reading means of the controller; along with U.S. Pat. No. 4,682,168, and which define the presently preferred embodiment for the remote station 40. In addition, the discussion of the Type A remote stations in U.S. patent application Ser. No. 921,185, filed Oct. 21, 1986, provides additional information about the remote station 40.

Figure 7A:
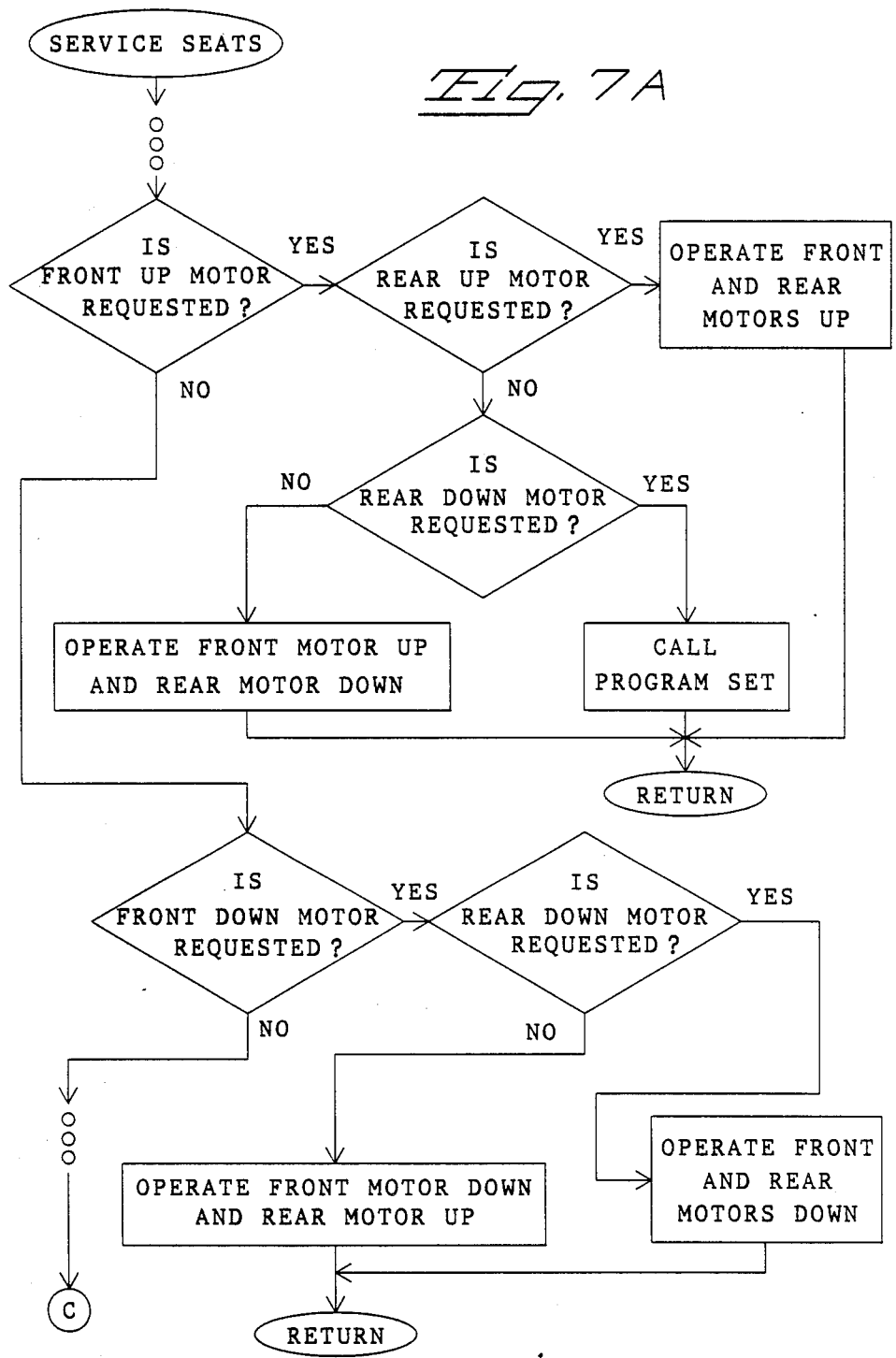
FIGS. 7a and 7b combine to form a flow chart of a portion of the Service Seats routine executed by the controller of FIG. 3.

FIGS. 7a–10 are flow charts of routines executed by the controller 30 in order to perform the memory seat function. The flow charts of FIGS. 7a and 7b are a portion of the Service Seats routine. This routine monitors the input signals IS1–IS6 in order to position the power seat motors M1–M3 as commanded by the operator. Each of the input signals IS1–IS6 is in either the on or the off state. When in the off state, no motor operation is commanded, and when in the on state the respective motor is commanded to move in the respective direction. Since each of the motors M1–M3 can move in either a forward or a reverse direction, there are a total of six input signals IS1–IS6 to control the three power seat motors M1–M3.

In part, the routine flow charted in FIG. 7a simply controls the motors M1–M3 in the conventional manner. For example, if both the front and rear motors are requested to move in the up direction, then they are operated as commanded. Similarly, if the front and rear motors are commanded in the down direction, then both the front and rear motors are controlled to move in the down direction. Similarly, if the front motor is commanded up and no motion is commanded of the rear motor, then the front motor is operated in the up direction and the rear motor in the down direction. Also, if the front motor is commanded in the down direction and the rear motor is not commanded in the down direction, then the front motor is operated in the down direction and the rear motor is operated in the up direction.

In this embodiment, other combinations of the input signals IS1–IS6 are used to store a selected seat position or to return the power seat to a previously stored position. This has been done in order not to increase the total number of input switches. Of course, it should be understood that in alternate embodiments separate switch input signals can be used to initiate these memory seat functions.

Figure 8A:
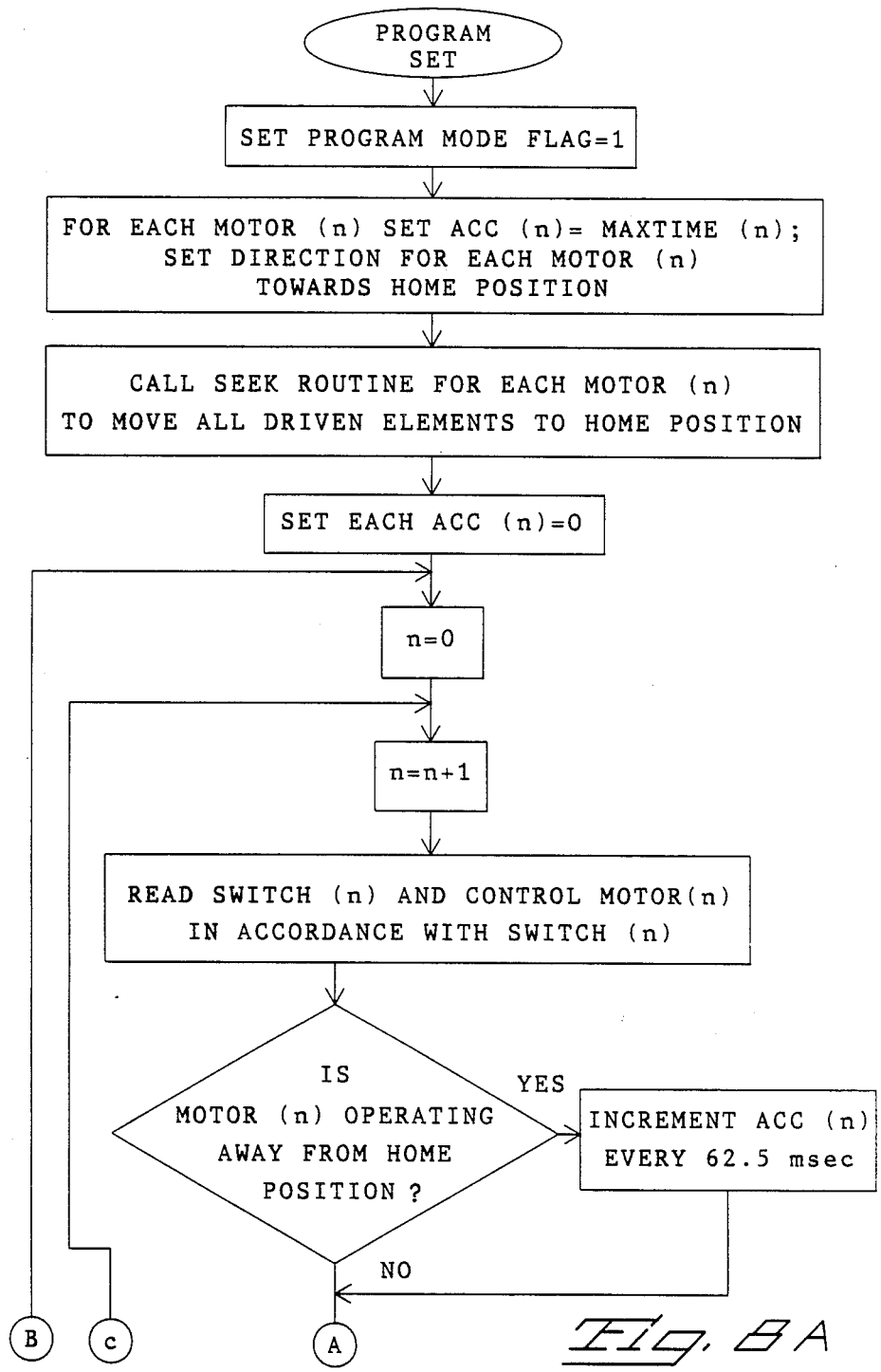

As shown in FIG. 7a, if the front motor is commanded in the up direction, the rear motor is not commanded in the up direction and the rear motor is commanded in the down direction, then the routine Program Set shown in FIG. 8a is executed. As pointed out above, it is also possible to provide a separate switch input signal to command the controller to execute the Program Set routine of FIGS. 8a and 8b.

Figure 8B:
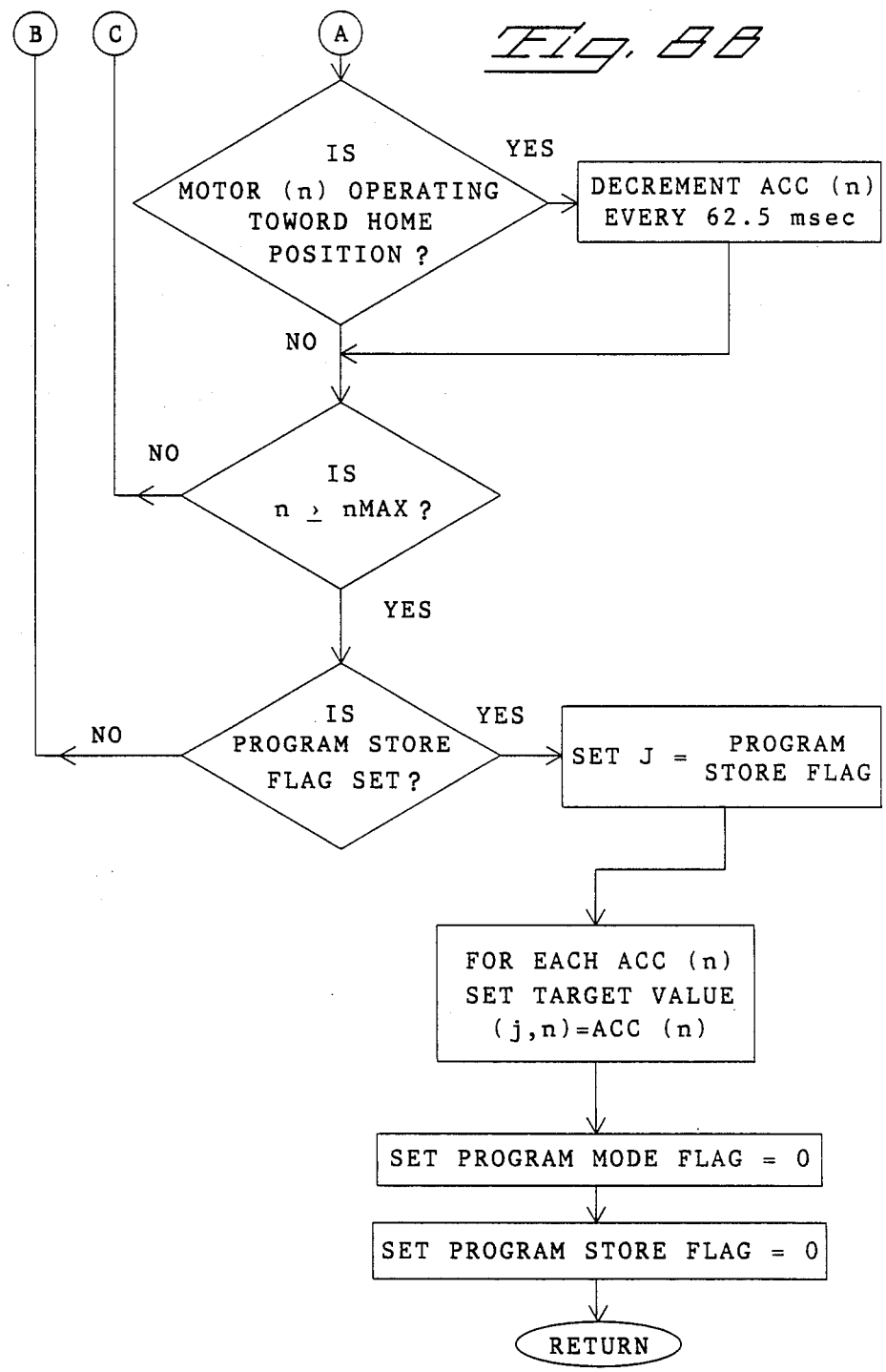

Turning to FIGS. 8a and 8b, the Program Set routine begins by setting the Program Mode Flag equal to 1. This flag is used as an indication that the Program Set routine is being executed to store a desired seat position. The next step is for each of the motors to be controlled to move to a respective home position. For this purpose a respective accumulator ACC(n) is set equal to a respective parameter MAXTIME(n) for each of the motors. For example, since memory positions are to be stored for each of the three power seat motors M1–M3 as well as for each of the four mirror motors M4–M7, the total number of motors is equal to 7 in this example, and seven separate accumulators ACC(n) are set, each with a respective parameter MAXTIME(n). Preferably, MAXTIME(n) is slightly greater than the largest time expected for the motor to move its respective driven member between the two extreme limits of travel. For example, where the motor M1 controls movement of the seat in the forward and rearward directions, ACC(1) should be set equal to a number slightly greater than the maximum time required for motor M1 to move the seat from the extreme forward to the extreme rearward position. This time of motor activation will of course vary with parameters such as ambient temperature, power voltage, and the like. MAXTIME(n) should be set equal to the maximum expected time in the most adverse conditions (for example low temperature and low power voltage). Once the accumulators have been set, the direction for each motor is set towards the home position and the Seek routine for each motor is called to move all of the driven elements to the home position.

Figure 10:
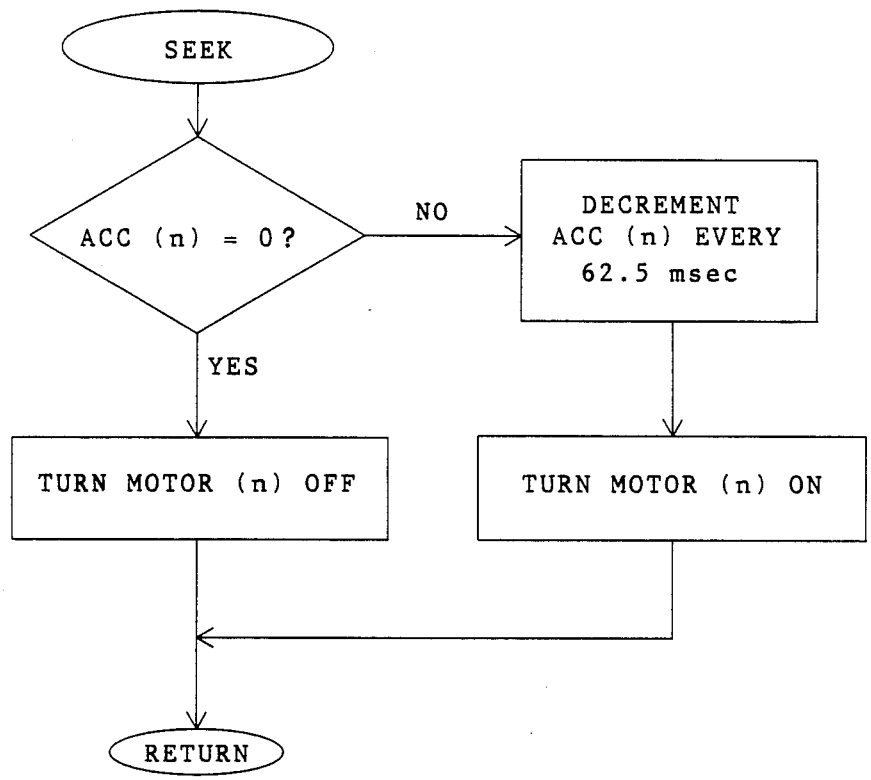
FIG. 10 is a flow chart of the Seek routine called by the routines of FIG. 8a and FIG. 9.

The Seek routine is flow charted in FIG. 10. This routine checks to determine whether accumulator ACC(n) is equal to zero. If so, the respective motor is turned off. Otherwise, ACC(n) is decremented every 62.5 milliseconds and the respective motor is turned on. Thus, the Seek routine is used to operate each of the motors for a time equal to MAXTIME(n) and then to automatically turn off each of the motors. This moves each of the driven elements to the home position. For example, in a power seat the home position may be with the seat moved to the extreme rearward position and both the front and rear motors to the extreme down positions.

Returning to FIG. 8a, the routine Program Set then resets each accumulator ACC(n) to zero and for each of the accumulators ACC(n) reads the corresponding input signals so as to control the motors in accordance with the signals. In the example of FIG. 1, the motor M1 is responsive both to input signal IS1 (commanding forward movement) and IS2 (commanding rearward movement). This portion of the Program Set routine reads input signals IS1 and IS2 and controls the motor M1 in accordance with the signals. The Program Set routine also monitors to determine whether the motors are operating away from the home position or toward the home position. When each motor is operating away from the home position, the respective accumulator ACC(n) is incremented every 62.5 milliseconds, and when each motor is operating toward the home position the respective accumulator ACC(n) is decremented every 62.5 milliseconds.

The Program Set routine continues to monitor the input signals to control the motors as commanded and to increment and decrement the accumulators. In effect, the accumulators ACC(n) integrate the time of motor activation for each of the motors, where motor operation away from the home position increases the value stored in an accumulator and operation of the motor towards the home position decreases the value stored in the accumulator. Given the assumption of constant motor velocity, the accumulators thus store a measure of the position of each of the respective driven elements. For example, as pointed out above motor M1 drives the power seat in the forward and rearward directions, and ACC(1) stores an integrated value of times of forward and rearward activation of the motor M1 and therefore the position of the seat in the forward and rearward direction. This process continues until the Program Store Flag is set.

Returning to FIG. 7b, the Program Store Flag is set when the Program Mode Flag is not equal to zero and the rear motor is commanded to move in either the up or down direction. When in these circumstances the rear motor is commanded to move in the up direction, the Program Store Flag is set equal to 1. When the rear motor is commanded in the down direction and the Program Mode Flag is not equal to zero, then the Program Store Flag is set equal to 2.

Returning to FIG. 8b, once the Program Store Flag is set equal to 1 or 2, the routine of FIG. 8b sets the variable j equal to the Program Store Flag and then for each accumulator ACC(n) sets Target Value (j, n) equal to ACC(n). Then the Program Mode Flag and the Program Store Flag are set equal to zero before Program Set returns.

The value of the Program Store Flag indicates whether the information in the accumulators ACC(n) is characteristic of driver number 1 or driver number 2. Once Program Set has been executed with the Program Store Flag equal to 1, each of the stored variables Target Value (1, 1), Target Value (1, 2), ... Target Value (1, 7) stores a motor activation time for a respective one of the motors M1–M7, for driver number 1. For example, Target Value (1, 1) stores a number indicative of the motor activation time (the time the motor M1 must be activated moving the power seat away from the home position) needed to move the power seat along the axis of motor M1 to the desired memory position. Thus, the Program Set routine operates to memorize a set of selected positions for either driver number 1 or driver number 2, depending upon the value of the Program Store Flag.

Figure 7B:
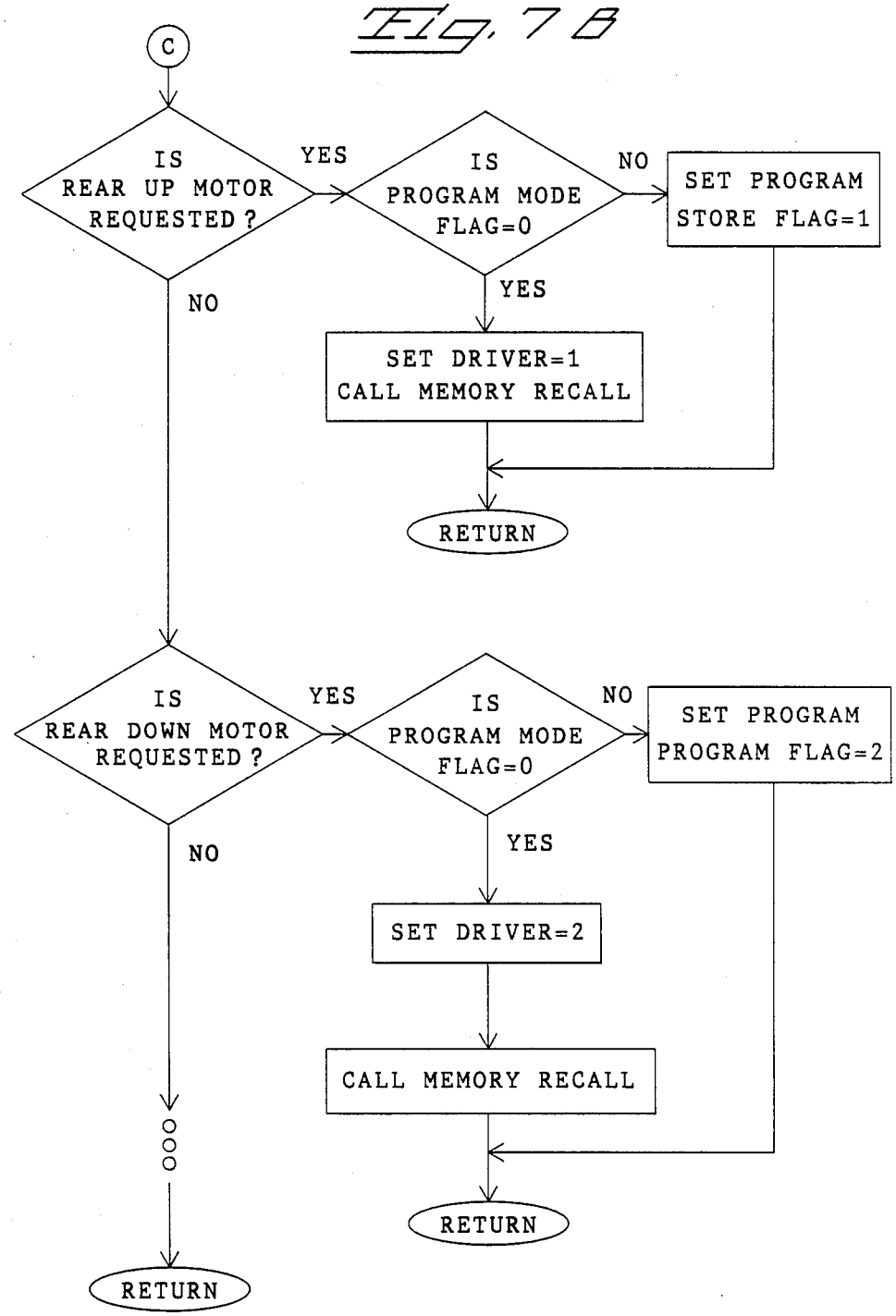

As shown in FIG. 7b, if the rear motor is commanded to move in the up or down direction and the Program Mode Flag is set equal to zero, then the routine Memory Recall is executed with Driver set to equal to 1 or 2 respectively. Memory Recall is used to return the power seat to the previously stored position for either driver number 1 or driver number 2, depending upon the state of the variable Driver.

Figure 9:
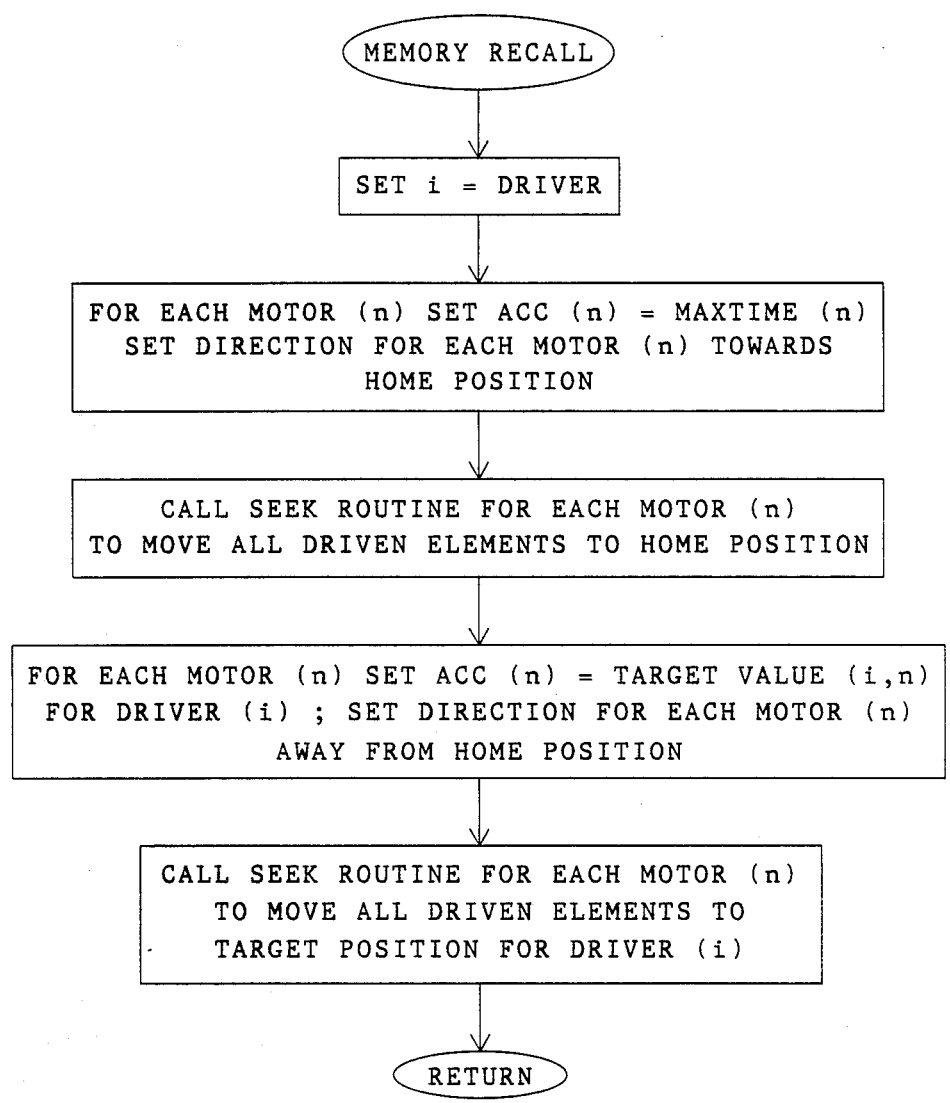
FIG. 9 is a flow chart of the Memory Recall routine called by the routine of FIG. 7b.

FIG. 9 shows a flow chart of the memory recall routine. This routine first sets i equal to Driver and then moves each of the motors M1–M7 to the respective home position. This is accomplished as described above by setting each accumulator ACC(n) equal to MAXTIME(n) for each of the motors, setting the direction for each of the motors towards the home position, and then calling the Seek routine of FIG. 10. Once each of the motors M1–M7 has been moved to the home position, Memory Recall then sets ACC(n) for each of the motors M1–M7 equal to Target Value (i, n). Then the direction for each of the motors is set away from the home position and the Seek routine is called for each of the motors. The Seek routine ensures that each of the motors is operated for a time corresponding to the respective Target Value (i, n). This moves all of the driven elements to the target positions for driver i.

Table 1 provides an object code listing of a program that performs the functions flow charted in FIGS. 7A–10. This listing is intended for use on an Intel 8051 microprocessor, and it utilizes the following locations for the stated variables and parameters:

| DATA INPUTS | 34H, BITS 2,5,6,7 |
|---|---|
| | 35H, BITS 0,1,2,5,6 |
| | 36H, BITS 1,2,5 |
| LOADS | |
| DRIVER'S FRONT UP/DOWN = | 26H |
| DRIVER'S FORWARD/REVERSE = | 26H |
| DRIVER'S REAR UP/DOWN = | 27H |
| DRIVER'S LEFT/RIGHT MIRROR = | 22H |
| DRIVER'S UP/DOWN MIRROR = | 21H |
| PASSENGER'S FRONT UP/DOWN = | 24H |
| PASSENGER'S FORWARD/REVERSE = | 25H |
| PASSENGER'S REAR UP/DOWN = | 25H |
| PASSENGER'S LEFT/RIGHT MIRROR = | 29H |
| PASSENGER'S UP/DOWN MIRROR = | 28H |
| TARGET VALUE (1,1) ... (1,7) = | 51H-57H |
| TARGET VALUE (2,1) ... (2,7)= | 58H-5EH |
| PROGRAM MODE FLAG = | F0H.2 |
| ACC(1) - ACC(7) = | 11H-17H |
| DRIVER 1 FLAG = | F0H.3 |
| DRIVER 2 FLAG = | F0H.4 |

MAXTIME(1)–MAXTIME(7) are all set to F0H in this listing, though alternately a separate value could be used for each.

From this description it should be apparent that the controller 30 operates to store a selected power seat and power mirror position and then at a later time to return the power seat and the power mirror automatically to the previously stored position. In the embodiment described above, this is accomplished by integrating the time of motor activation in either the forward or reverse direction. Thus, no additional sensing hardware of any type is required to sense the position of the motors or their respective driven elements along the respective axes. The speed of motor operation will of course vary to some extent according to variables such as ambient temperature and power voltage. However, for many applications the extremely simple system described above provides an adequate accuracy of positioning for the motors M1–M7. The approach described above is not limited to use with memory seats, but can also be applied to other motors such as radio mast motors that control the length of a radio antenna mast. By returning the mast motor to a home position and then moving it away from the home position for a time corresponding to a previously stored value, the mast can be moved to a desired position.

In addition, a memory seat system can be designed to use signals indicative of motor operation other than the time of motor activation. For example, the magnetically sensed rotation of a toothed wheel or the optically sensed rotation of a segmented disk mounted to rotate when the motor operates can be used to produce periodic signals which are integrated to provide a measure of motor position.

Of course, it should be understood that a wide range of changes and modifications can be made to the preferred embodiments described above. For example, other types of multiplex systems can be used, including multiplex systems with a larger or smaller number of conductors in the control bus, as well as multiplex systems using fiber optic control buses. It is therefore intended that the foregoing detailed description be regarded as illustrative rather than limiting, and that it be understood that it is the following claims, including all equivalents, are intended to define the scope of this invention.

I claim:

1. In a vehicle of the type comprising a driver's seat; a plurality of motors coupled to the seat to adjust seat position along respective axes, means for generating a plurality of input signals, a multiplex system comprising at least one first remote station coupled to the input signals generating means to generate multiplexed input signals in response to the input signals, a central controller, at least one second remote station coupled to the motors to control operation of the motors in response to multiplexed motor control signals generated by the controller; and at least one control bus interconnected between the controller and the remote stations to carry the multiplex input signals from the first remote station to the controller and to carry the multiplexed motor control signals from the controller to the second remote station, and means, included in the controller, for generating the multiplexed motor control signals to control the motors in response to the multiplexed input signals; the improvement comprising:
    first means, included in the controller, for generating motor control signals to automatically drive each of motors to a respective home position;
    means, included in the controller, for storing a set of motor activation times which define a selected seat position, said storing means comprising:
    means for activating the first means to drive the motors to the respective home positions;
    means for automatically timing periods of motor activation for each of the motors as the motors are manually controlled by the input signal generating means to move the seat to the selected position; and
    means for storing the times periods of motor activation as said motor activation times; and
    means, included in the controller, for automatically moving the seat to the selected seat position, said moving means comprising:
    means for activating the first means to drive the motor to the respective home positions; and
    means for automatically generating motor control signals to drive each of the motors for a time corresponding to the respective motor activation times to drive the seat to the selected position.

2. The invention of claim 1 wherein the automatically timing means comprises:
    a counter;
    means for periodically incrementing the counter during periods of operation of a respective one of the motors in a first direction; and
    means for periodically decrementing the counter during periods of operation of the respective motor in a second direction.

3. In a vehicle of the type comprising a driver's seat; a plurality of motors coupled to the seat to adjust seat position along respective axes, means for generating a plurality of input signals, a multiplex system comprising a central controller, at least one first remote station coupled to the input signals generating means to generate multiplexed input signals in response to the input signals, at least one second remote station coupled to the motors to control operation of the motors in response to multiplexed motor control signals generated by the controller; and at least one control bus interconnected between the controller and the remote stations to carry the multiplexed input signals from the first remote station to the controller and to carry the multiplexed motor control signals from the controller to the second remote station, and means, included in the controller, for generating the multiplexed motor control signals to control the motors in response to the multiplexed input signals; the improvement comprising:
    first means, included in the controller, for generating motor control signals to automatically drive each of the motors to a respective home position;
    means, included in the controller, for storing a set of target values which define a selected seat position, said storing means comprising:
    means for activating the first means to drive the motors to the respective home positions;
    means for automatically integrating a signal indicative of motor operation for each of the motors as the motors are manually controlled by the input signal generating means to move the seat to the selected position, thereby generating an integrated value for each of the motors;
    means for storing the integrated values as said target values; and
    means, included in the controller, for automatically moving the seat to the selected position, said moving means comprising:
    means for activating the first means to drive the motors to the respective home positions; and
    means for automatically generating motor control signals to drive each of the motors until the integrated value indicative of motor operation corresponds to the target value for each motor, thereby driving the seat to the selected position.

4. The invention of claim 3 wherein the signal indicative of motor operation is indicative of the time duration of motor operation.

5. The invention of claim 4 wherein the automatically integrating means comprises:
    a counter;
    means for periodically incrementing the counter while a respective one of the motors is operating in a first direction; and
    means for periodically decrementing the counter while the respective one of the motors is operating in a second direction.

6. The invention of claim 3 wherein the automatically integrating means comprises:
    a counter;
    means for automatically incrementing the counter when the signal indicative of operation of a respective one of the motors indicates motor operation in a first direction; and means for automatically decrementing the counter when the signal indicative of operation of the respective motor indicates motor operation in a second direction.

7. In a motor control system of the type comprising a motor coupled to a driven element to drive the element between a home position and an extreme position; means for generating an input signal; and a multiplex system interconnected between the input signal generating means and the motor to control the motor in response to the input signal; said multiplex system comprising a central controller, a first remote station coupled to the input signal generating means to send first multiplexed signals to the controller indicative of the state of the input signal, means in the controller for generating multiplexed control signals in response to the first multiplexed signals, and a second remote station coupled to the motor to control the motor in response to the multiplexed control signals; the improvement comprising:

first means, included in the controller, for generating motor control signals to automatically activate the motor to move the driven element to the home position;

means, included in the controller, for storing a motor activation time which defined a selected position of the driven element with respect to the home position, said storing means comprising:

means for activating the first means to drive to the driven element to the home position;

means for automatically timing periods of activation of the motor as the motor is controlled by the input signal to move the driven element to the selected position; and means for storing the times periods of motor activation as said motor activation times; and means, included in the controller, for automatically driving the driven element to the selected position, said automatically driving means comprising:

means for activating the first means to drive the driven element to the home position; and means for automatically generating motor control signals to drive the motor for a time corresponding to the respective motor activation time to drive the driven element to the selected position.

8. The invention of claim 7 wherein the automatically timing means comprises:

a counter;

means for periodically incrementing the counter when the motor is operated in a first direction; and means for periodically decrementing the counter when the motor is operated in a second direction.

* * * * *

UNITED STATES PATENT OFFICE
CERTIFICATE OF CORRECTION

Patent No. 4,845,415　　　　　　　　Dated　July 4, 1989

Inventor(s)　　　Lee Walter Steely

It is certified that error appears in the above-identified patent and that said Letters Patent is hereby corrected as shown below:

In claim 1, column 9, line 55, the word "times" should be --timed--.

In claim 7, column 11, line 28, the word "defined" should be --defines--.

In claim 7, column 12, line 9, the words "times periods" should be --timed period--.

In claim 7, column 12, line 10, the word "times" should be --time--.

Signed and Sealed this

Seventeenth Day of July, 1990

Attest:

HARRY F. MANBECK, JR.

*Attesting Officer*　　　　　*Commissioner of Patents and Trademarks*